US010210655B2

(12) United States Patent
Ramadoss et al.

(10) Patent No.: US 10,210,655 B2
(45) Date of Patent: Feb. 19, 2019

(54) POSITION ONLY SHADER CONTEXT SUBMISSION THROUGH A RENDER COMMAND STREAMER

(71) Applicant: Intel Corporation, Santa Clara, CA (US)

(72) Inventors: Murali Ramadoss, Folsom, CA (US); Balaji Vembu, Folsom, CA (US); Hema C. Nalluri, Hyderabad (IN); Michael Apodaca, Folsom, CA (US); Jeffery S. Boles, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 169 days.

(21) Appl. No.: 14/865,933

(22) Filed: Sep. 25, 2015

(65) Prior Publication Data
US 2017/0091989 A1    Mar. 30, 2017

(51) Int. Cl.
*G06T 15/80* (2011.01)
*G06T 1/20* (2006.01)
*G06F 9/48* (2006.01)

(52) U.S. Cl.
CPC ......... *G06T 15/80* (2013.01); *G06F 9/48* (2013.01); *G06T 1/20* (2013.01)

(58) Field of Classification Search
None
See application file for complete search history.

(56) References Cited

U.S. PATENT DOCUMENTS

| 6,900,810 | B1 * | 5/2005 | Moreton | G06T 15/005 345/506 |
| 6,940,515 | B1 * | 9/2005 | Moreton | G06T 1/20 345/501 |
| 7,400,325 | B1 * | 7/2008 | Gimby | G06T 15/40 345/418 |
| 7,468,726 | B1 * | 12/2008 | Wloka | G06T 15/40 345/419 |
| 7,598,958 | B1 | 10/2009 | Kelleher | |
| 8,704,835 | B1 | 4/2014 | Hakura et al. | |
| 2003/0164833 | A1 | 9/2003 | Walls | |
| 2010/0110084 | A1 | 5/2010 | Leather | |
| 2012/0081370 | A1 | 4/2012 | Min | |
| 2013/0135341 | A1 * | 5/2013 | Seetharamaiah | G06T 15/005 345/619 |
| 2014/0043342 | A1 * | 2/2014 | Goel | G06T 9/00 345/501 |

(Continued)

OTHER PUBLICATIONS

NVIDIA Corporation, "Cg Toolkit User's Manual", Feb. 2003, NVIDIA Corporation, Release 1.1.*

(Continued)

*Primary Examiner* — Robert Bader
(74) *Attorney, Agent, or Firm* — Trop Pruner & Hu, P.C.

(57) ABSTRACT

By scheduling/managing workload submission to a position only shading pipe one can exploit parallelism with minimum impact to the software scheduler in some embodiments. An interface submits workloads to a slave engine running in one parallel pipe to assist a main engine running in another parallel pipe. Command sequences for each parallel pipe are separated to enable the slave engine to run ahead of the main engine. The slave engine is a position only shader and the main engine is a render engine.

30 Claims, 18 Drawing Sheets

(56) References Cited

U.S. PATENT DOCUMENTS

2014/0104287 A1* 4/2014 Nalluri .................... G06F 21/74
　　　　　　　　　　　　　　　　　　　　　　　　345/522
2014/0146062 A1* 5/2014 Kiel ..................... G06F 11/3664
　　　　　　　　　　　　　　　　　　　　　　　　345/522

OTHER PUBLICATIONS

Erik Lindholm, Mark J Kilgard, Henry Moreton, "A User-Programmable Vertex Engine", Aug. 17, 2001, ACM, SIGGRAPH '01 Proceedings of the 28th annual conference on Computer graphics and interactive techniques, pp. 149-158.*

PCT Search Report and Written Opinion dated Nov. 22, 2016 in corresponding PCT/US2016/048524 (10 pages).

* cited by examiner

POSITION ONLY SHADER CONTEXT SUBMISSION THROUGH A RENDER COMMAND STREAMER

BACKGROUND

A significant number of primitives are culled in graphics processing because they are back-facing, outside the view frustum or too small. Since they are not pertinent to the display, it is inefficient to process them any more than necessary.

A position only shader (POSH) has a graphics pipeline (POSH/Cull pipe) that runs ahead of the traditional render pipeline to filter out these non-visible primitives. The POSH pipeline uses a dedicated engine to operate on three-dimensional (3D) workloads to generate visibility data prior to getting them executed on a traditional render pipe. Visibility data output by the POSH pipe is used by the Vertex Fetch (VF) logic in the traditional render engine to optimize workload execution by discarding the non-visible vertices.

BRIEF DESCRIPTION OF THE DRAWINGS

Some embodiments are described with respect to the following figures.

DETAILED DESCRIPTION

The POSH Pipe and Render Pipe are not completely independent. At the same time they are not very tightly coupled down to the instruction level. Some level of parallelism exists. By scheduling/managing workload submission to a POSH Pipe one can exploit this parallelism with minimum impact to the software scheduler in some embodiments.

A POSH plus Render pipeline may be a monolithic engine from a software perspective. This provides software with a single unified interface to submit a workload to the parallel POSH pipes. Software may use a single context to submit work to the modified Render plus POSH pipeline through its associated ring buffer. This interface also simplifies preemption.

POSH-based tiled deferred rendering uses a position only hardware pipe to sort the triangles to different tiles and create visibility information for each tile in the position only shading pipe. After the entire render target worth of visibility information is calculated, the replay pipe uses this visibility information and renders one tile at time.

Clipping in a three-dimensional (3D) graphics pipeline is generally performed to discard portions of the scene that lie outside of the view frustum. A clip stage examines the positions of the incoming vertices and performs the vertex clip test against the view frustum. The results of clip test of all vertices in an object determines how the object is processed further down the pipeline.

Objects that are completely outside the view volume are discarded or trivially rejected (TR). Objects that are contained completely inside the view volume remain unchanged and are directly sent down the pipeline for further processing or Trivially Accepted (TA). Objects that are intersected by the view volume are sent to the Clip Processing stage so that they can be split into primitives that only lie within the view volume, which operation is called the Must Clip Operation (MC).

Figure 1:
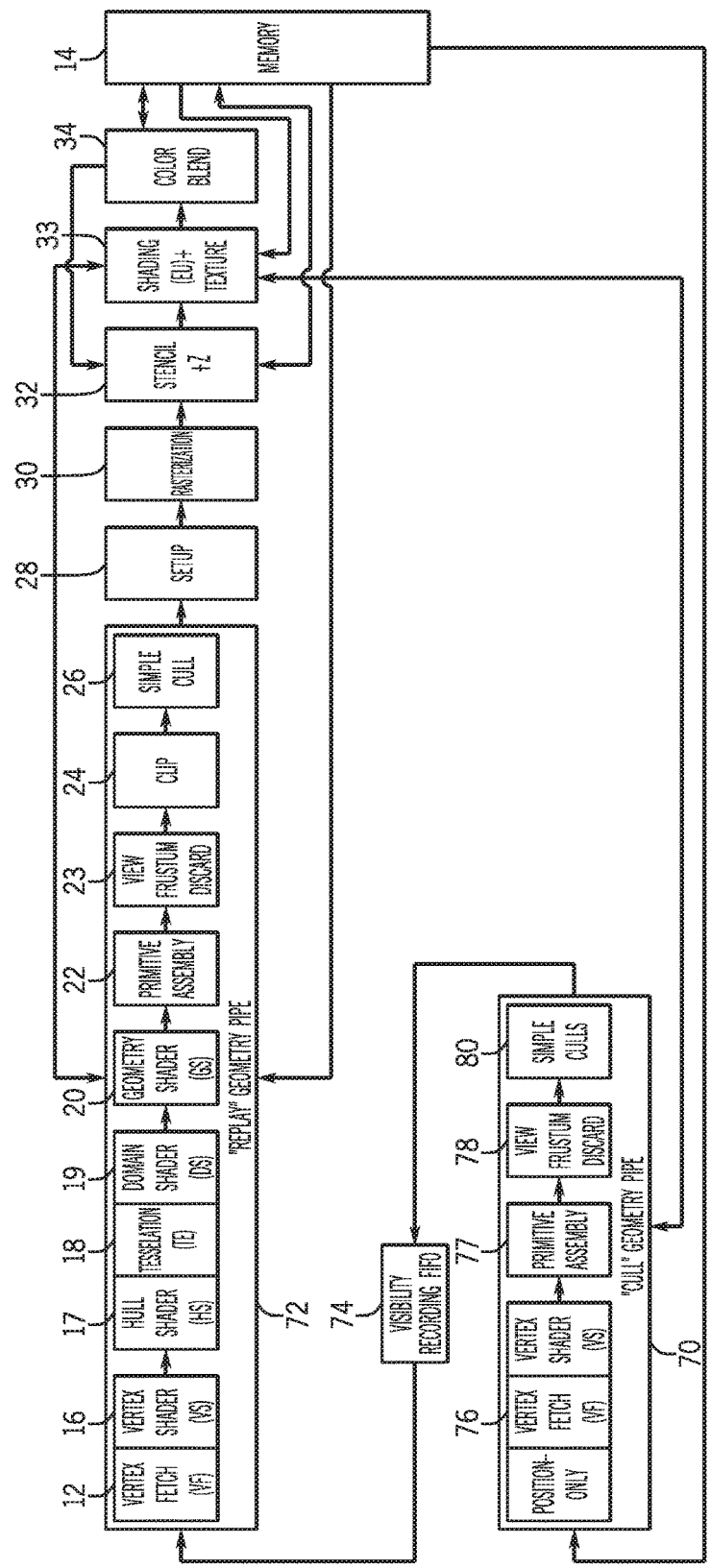
FIG. 1 is a block depiction of a POSH architecture according to one embodiment.

FIG. 1 shows a position only shader based graphics processing unit according to one embodiment. A POSH implementation takes care of marking triangles that are completely outside view frustum (TR) as not visible. Triangles that are completely inside are further tested with each tile window to find if the particular triangle is visible per tile or not and correspondingly marked as visible or not visible per tile. Triangles that intersect the view frustum are generally treated as visible for all tiles as a final clipping operation has not been performed yet.

FIG. 1 shows a simplified block diagram of an architecture that has two geometry pipes—the Cull Pipe 70 and the Replay Pipe 72. Both the pipes execute different instances of the same application where each instance can be working on a completely different draw call. The responsibility of the Cull Pipe is to compute the visibility information of the triangles whether the triangle is rejected or not. This information is stored in the Visibility Recording First In First Out (FIFO) 74 that in turn is consumed by the Replay Pipe for skipping the discarded triangles. Moreover, the Cull Pipe generates this critical information faster by only fetching and shading the position attributes. In this way, both the pipes work together to reduce the amount of work required for the culled triangle sequences and also to skip them efficiently.

As shown in FIG. 1, the Cull Pipe is shallow as well as leaner when compared to the Replay Pipe. It has a position-only vertex fetch (VF)-vertex shader (VS) stage 76 for shading the position attributes followed by the primitive assembly 77 and viewport frustum discard stage 78 and the simple cull stage 80. The instruction set in the culling pipe only includes those instructions needed for calculating position attributes and does not have the instruction for calculating other shader attributes. This shallow pipeline computes the visibility information for each triangle of a draw call and records this information in a chronological order inside the visibility recording FIFO.

The recorded information is kept as a bitwise sequence, for example using 0 for the failing triangle and 1 for the passing triangle and, thus uses a small amount of storage area in some embodiments. The Cull Pipe may run at least one draw call ahead such that the Replay Pipe is not starved for the visibility information. Usually, a 3D frame is made up of varying numbers of render-passes that work on a given render-target(s). A frame ends in the composition phase where the intermediate information recorded in the render targets is blended together to generate the final frame buffer.

Each render pass has an arbitrary number of draw calls that in turn is actually a collection of triangulated surfaces that define the shape of the object. Since the cull pipe avoids the rasterization as well as the rendering of pixels for a draw call, it can run ahead and compute the visibility information in a timely manner. However, if the information for a draw call is not available then the replay pipe may stall. Similarly, if there is no room in the visibility recording FIFO then the cull pipe may stall.

Usually, a 3D scene starts out as a collection of triangulated surfaces where vertices of the triangles define the shape of the object. These input lists of vertices are fed to the vertex fetch (VF) unit 12 that in turn fetches the attributes associated with the vertices from memory 14. In vertex shader (VS) unit 16, the fetched attributes of the vertices are transformed using the programmable shaders. One can think of these programmable shaders as subroutines that map vertices onto the screen and add special effects to the objects in a 3D environment by performing mathematical operations on their attributes. These shaders are dispatched to the thread processors—referred to as execution units (EUs)—where the attributes of vertices (like position, color, texture-coordinates etc.) are transformed and the computed values are stored in the local memory for reference by the subsequent pipe stages.

The output of the VS unit goes to the next pipeline stages, which are hull shader 17, tessellation 18, domain shader 19 and geometry shader 20 if applicable or sent to the primitive assembly unit 22 where the triangles are created. After creation of the triangles comes the clipping stage 24 where the triangles that are outside the viewport frustum, as determined in the viewport frustum discard 23, are discarded. On the other hand, the triangles that are within the planes of the viewport frustum are accepted and sent to the subsequent pipe stages. Moreover, the clipping stage can also clip the triangles that intersect with the planes of the view frustum.

The triangles that survived the viewport frustum discard 23 are yet again examined by the simple cull stage 26 to confirm whether the triangle will be part of the final image or not, and the objects that fail these tests are thrown away. For example, the back facing, degenerate, zero area etc. triangles are discarded in this stage. For some applications, more than about 80% of the triangles are discarded either by the viewport frustum or simple cull stage. Finally, the passing triangles are sent to the setup and rasterization units 28 and 30.

The second part of the baseline architecture is the pixel pipe that contains the rasterization 30, depth 32, the shading and texture 33 and color blend 34. The pixel pipe begins with the rasterization unit 30 that determines the location of all the pixels that either lie inside or on the edges of the triangles sent by the geometry pipe. Further, it divides the triangles into symmetrical blocks of pixels that are sent to the depth (Z) pipe 32 for depth test. As multiple objects in the 3D scene can map to the same position, the depth pipe determines whether the pixels embedded in the block are closest to the observer or are hidden by the previously observed pixels belonging to a different object. The pixels that pass the depth tests are shaded (shading and texture 33) for determining their color and other attributes related to them. Finally, the computed values of the pixels are sent to the color pipe 34 that can either optionally blend the computed values with the previously known states or send them to update the frame buffer.

Figure 2:
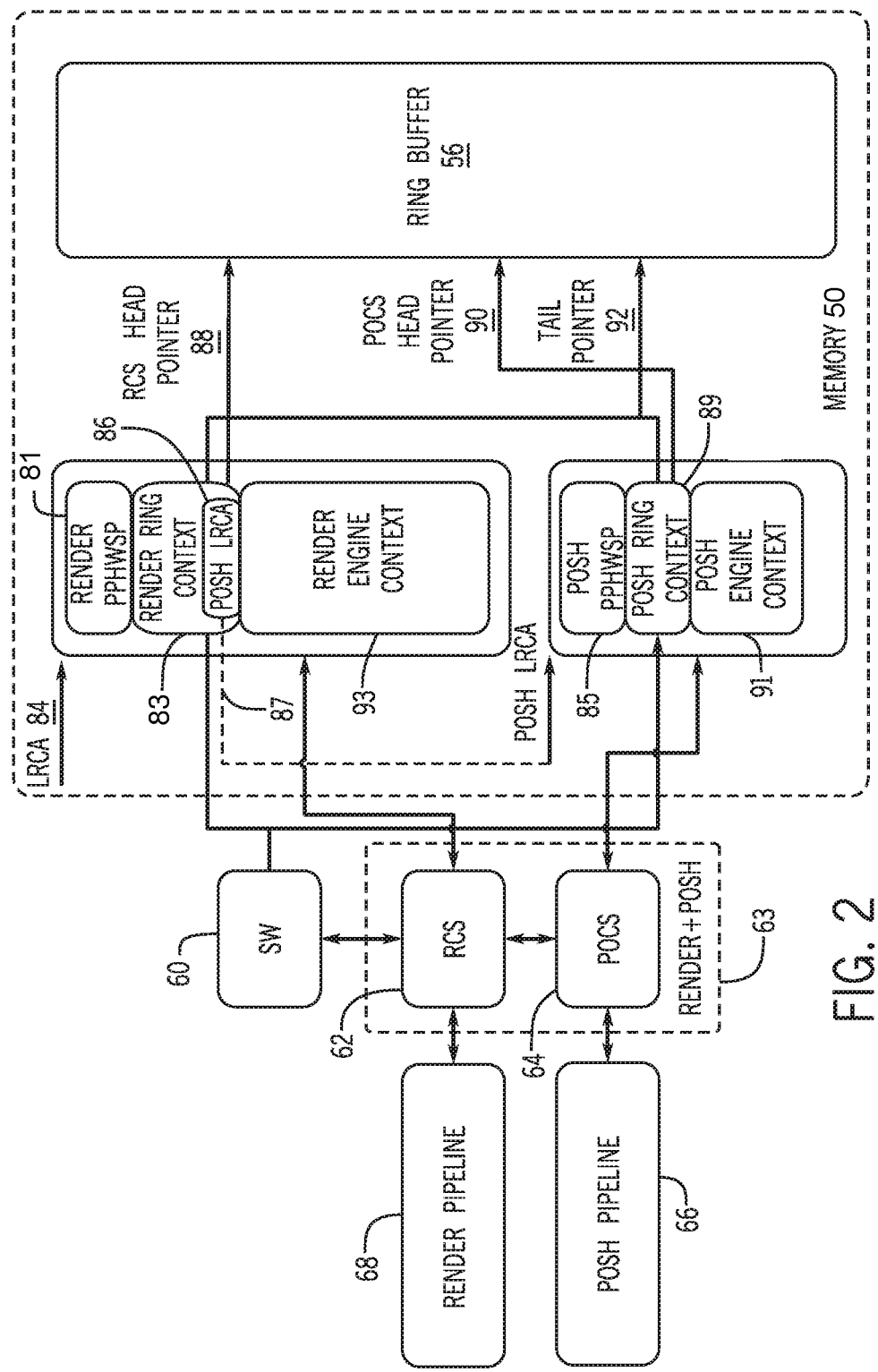
FIG. 2 is a schematic depiction of a render engine according to one embodiment.

Referring to FIG. 2, software (SW) 60 separates command sequences for each pipe 66 or 68 to enable the POSH pipe 66 to run ahead of the Render pipe 68. Infrastructure is provided to synchronize the two pipes (when required) through software inserted commands. The POSH command streamer (POCS) 64 also manages the "parallel state" for the POSH pipeline so that a traditional rendering pipeline can continue making progress.

The Render plus POSH pipeline 63 may be a single monolithic engine without changes to the software scheduler, removing the complexity and the latencies involved in scheduling. Once a context is submitted to the render engine, both POSH and render engine execute in parallel, resulting in a POSH output consumed by the render engine. The POSH hardware pipeline 66 is built as an assist to an existing render pipeline 68 which can be configured to be enabled or disabled hierarchically based on the workload requirements at a context level, command buffer level or primitive level.

A context submitted to a render engine exercising POSH functionality is called "POSH Enabled" context. A graphics driver may decide if a context is POSH Enabled at the time of context creation. A context may be indicated as POSH Enabled to hardware by setting a "POSH Enable" bit in a register of render engine. Software allocates additional separate memory space, POSH logical ring context address (LRCA) 86, for the POSH Enabled contexts. A POSH pipe may use the POSH LRCA memory space for its context state management.

Workload to hardware is submitted at context granularity. A context descriptor is submitted as a submission which is an pointer to memory which has all the details regarding the context that is required for hardware to execute the context. The render ring context 83 is part of the context image that has information regarding the memory setup for the context memory access. The render ring context also has the register 86 that states if a context is POSH enable or not. The render ring context also has the details of the ring buffer 56 which is the primary means for submitting commands and command buffers for a context for execution.

Render scratch space 74 and POSH scratch space 85 are scratch spaces for software and hardware usage. They are primarily used by hardware to report statistics of the context. Software uses this space for reporting fence values from time to time.

The POSH ring context 89 is part of the context that has the details of the ring buffer which is the primary means for submitting commands and command buffers for a context for execution. Both Render Command Stream (RCS) and POCS share the same ring buffer 56. The ring buffer is a circular storage managed using head pointers 88/90 and tail pointer 92 to indicate where in software the commands for hardware execute. Software programs commands in to ring buffer and updates the tail pointer indicating the location of the last instruction to be executed. Hardware executes commands starting from the head pointer and keeps executing instructions until it reaches the tail pointer. Whenever hardware makes forward progress it increments the head pointer indicating the progress it has made. Even though POCS and RCS share the same ring buffer and the tail pointer, they have their own copy of head pointer as each of them is executing at their own pace asynchronously to each other. The RCS head pointer 88 is the head pointer of RCS. The POCS head pointer 90 is the head pointer of POCS.

A workload is submitted on context granularity to RCS (implies to POCS). Context can get switched out due to various reasons (semaphore waits, wait for display events or preemption from software). When a context gets switched out, its current state needs to be saved to POSH engine context 91 or render engine context 93 so that when resubmitted it can restore and resume form the place it has left off. However hardware supports infrastructure wherein both POCS and RCS can have their own independent ring buffers.

A context submission model may be visualized as a context submitted to Render Command Streamer (RCS) 62, which is part of the hardware front end 63 of the render engine. The hardware front end is responsible for getting commands, setting states for the pipeline, restoring states and sending commands down the pipeline. The RCS sets up the context definition in hardware and triggers the POSH pipe to execute the POSH Enabled context, resulting in execution of the same ring buffer by the render pipe and the POSH pipe in parallel.

The POSH pipe has its own command streamer called POCS (POSH Command Streamer) 64. Similarly when the context is switched out on the render pipe, for example, due to Wait For Event, Semaphore Wait or Preemption due to pending context, RCS ensures that the POSH pipe is preempted and its corresponding logic state is saved by POCS.

The software 60 is only directly connected to the RCS. It is only connected to the POCS through the RCS in one embodiment.

While POCS and RCS execute the same ring buffer 56, the executions of the same ring buffer by POCS and RCS are asynchronous to each other. Software 60 may ensure that POCS and RCS are synchronized through semaphores is one example. Software may provide independent command buffers (batch buffers) to be executed by RCS and POCS.

Each of the two engines, the render pipeline and the POSH pipeline, has its own state, called the logical ring context (LRC), which is a logical state of the engine.

The RCS has a pointer 87 to the POSH logical ring context address (LRCA) 86. POSH LRCA 86 is pointing to the start of POSH scratch space 85. Each engine may independently set the place where commands are stored, the starting pointers and the state of the engines. The logical ring context address is a virtual address for every context. Each of the engines has a special state to start the engine operation. Each engine gets initial states from the RCS. The RCS knows where the POSH is enabled.

The POCS is a slave to the RCS. The POCS is triggered by the RCS and then it gets its own state and starts operating.

The ring buffer 56 is where commands are programmed for both engines. There is a command buffer in the ring buffer. Two different sets of command executions are sent from the ring buffer. Both command streamers get their states from the LRC in memory 50. Both command streamers process the same operations at their own pace in parallel. However execution of the ring buffer results in two different sets of command sequences. Context can be configured for each of the RCS and POCS to have its own ring buffer.

Within the ring buffer there are indirection pointers. The first level batch buffer start (BBS) indicates a direction to follow from the ring buffer to execute commands elsewhere in memory. Within the batch buffer there is more indirection which goes to a second level batch buffer and finally to a second level batch buffer end (BBE). Then the flow returns back to the first level batch buffer.

Batch buffer ends (BBEs) indicate to stop and go back to the previous level from which the flow got the batch buffer address (BBA). Then going forward, a batch buffer start (BBS) is defined which results in command signals.

The ring buffer command streamer renders command streamer commands packed by the software. The ring buffer is executed by the RCS.

Two bits in batch buffers indicate one of POSH Enable and POSH Start. POSH Enable is a hint to a portion of the command streamer indicating the command sequence from a particular indirection pointer. This indirection pointer has commands that are meant to be executed by a POSH portion of the command streamer. POSH Start commands from this indirection pointer are meant to be executed by POSH. POSH Start tells the render command streamer the command sequence should not be executed by the RCS.

Figure 3:
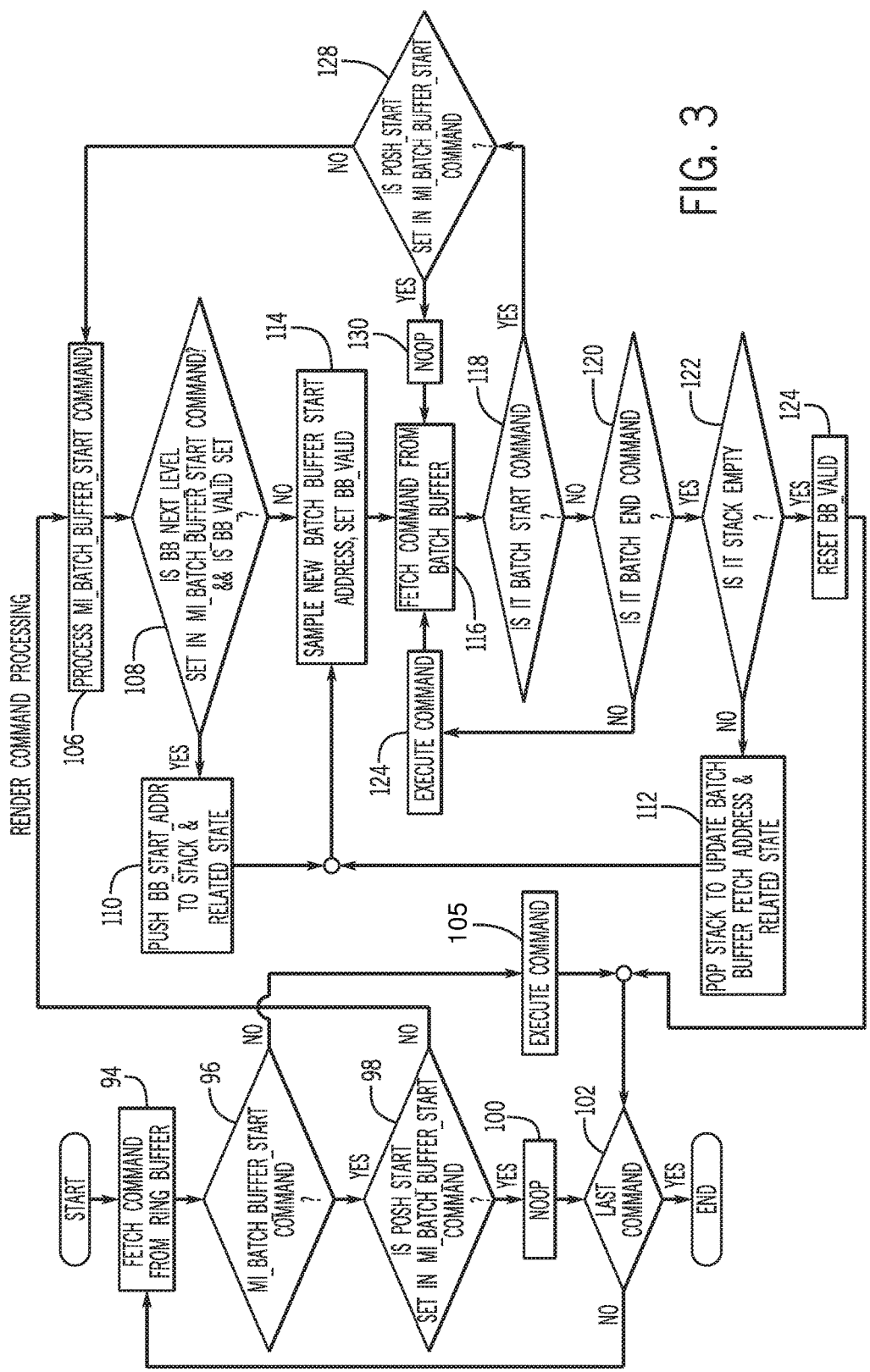
FIG. 3 is a flow chart for render command processing for one embodiment.

FIG. 3 is a flow chart for render command processing. The sequence shown in FIG. 3 may be implemented in software, firmware and/or hardware. In software and firmware embodiments, it may be implemented by computer executed instructions stored in one or more non-transitory computer readable media such as magnetic, optical or semiconductor storages. For example, the instruction may be stored in a graphics processing unit or stored in a storage associated with the graphics processing unit, as two examples.

The POSH Start Command Buffer is a dedicated Command Buffer (Batch buffers) to be executed by the POSH pipe, indicated by setting the field "POSH Start" in the MI_BATCH_BUFFER_START command header. Once "POSH Start" is set in a batch buffer all the following chained batch buffers and next level batch buffers implicitly inherit the "POSH Start" field value. Once "POSH Start" is set in a batch buffer, all the following command sequences are to be executed by POCS until the corresponding batch buffer sequencing is terminated through a batch end command. RCS, on parsing MI_BATCH_BUFFER_START command with "POSH Start" enabled, no operates (NOOPS) the command and moves on to the following command.

Initially a command is fetched from the ring buffer as indicated in block 94. Next, at diamond 96, the flow determines whether the MI_BATCH_BUFFER_START command is found in the command header. If so, a check at diamond 98 determines whether POSH Start is set in the MI_BATCH_BUFFER_START command header. If so, then there is a no operation (NOOP) as indicated at block 100. A check at diamond 102 determines whether this is the last command. If so, the flow ends and otherwise the flow iterates.

If the check at diamond 98 indicates that POSH Start is not set, then render command processing is implemented beginning with processing MI_BATCH_BUFFER_START command at block 106. A check at diamond 108 determines whether the batch buffer next level and batch buffer valid are set in the MI_BATCH_BUFFER_START command header. If so, in block 110, a batch buffer start address is pushed onto the stack with related states as indicated in block 110. Then the flow returns to block 114. In block 114 the new batch buffer start address is sampled and batch buffer valid is set.

At block 116, a command is fetched from the batch buffer. A check at diamond 118 determines if it is a batch start command. If so, in diamond 128, a check determines whether POSH Start is set in the MI_BATCH_BUFFER_START command header. If not, the flow goes back to block 106. Otherwise, the flow goes to no operation block 130 and then returns to block 116.

Next a check at diamond 120 determines whether a batch end command has been indicated. If not, the command is executed in block 124 and the flow returns to block 116.

However, if that batch end command has been indicated, then a check at diamond 122 determines whether it is a stack empty. For the very first batch buffer processing, batch end stack will be empty. Take a case wherein a Batch Buffer start command with next level is set processed within a batch buffer, the current execution pointer is saved (pushed on to stack) and jumps to the new location pointed to. In the next execution sequence when the batch end is encountered, hardware knows, based on the stack status, if it has to go back to previous pending point or to the ring buffer.

Figure 5:
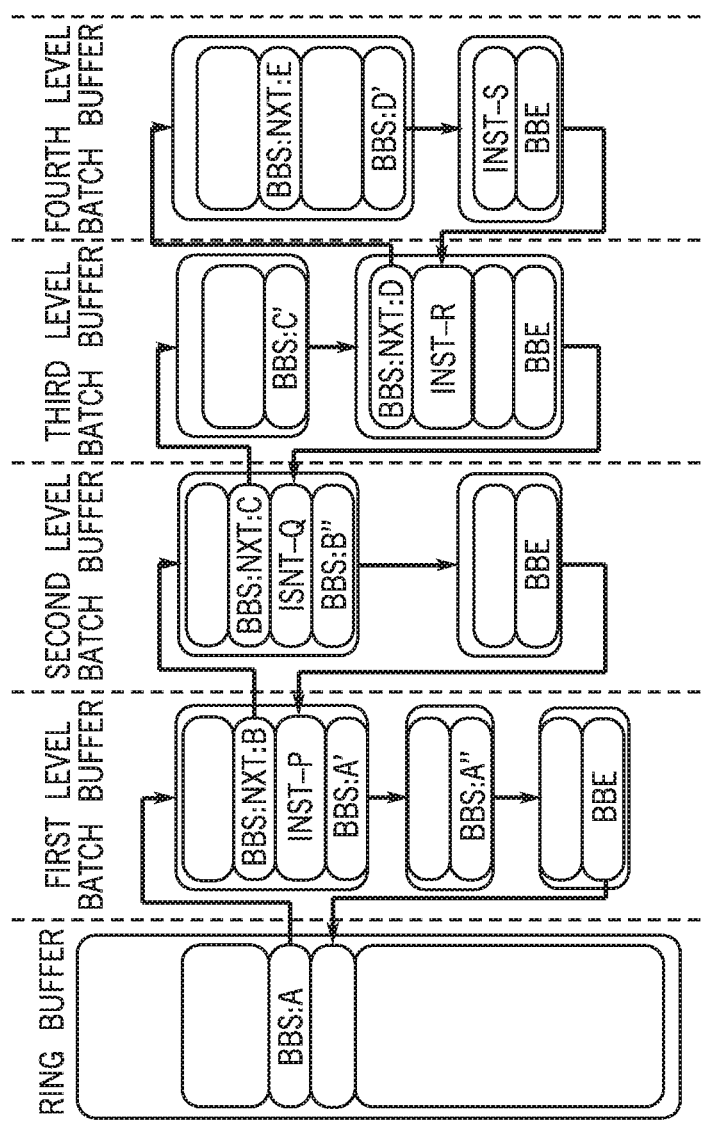
FIG. 5 is a depiction of batch buffers for one embodiment.

In FIG. 5, when execution flow goes from first level batch buffer to second level batch buffer, an execution pointer of first level is pushed on to stack. Similarly whenever execution goes from second level batch buffer to third level batch buffer and to fourth level batch buffer, the execution pointers of second and third level batch buffers are pushed on to stack. When batch end is executed at any point, it means, get the latest value on the stack which holds the back tracking path. If the check at diamond 122 indicates empty, the batch buffer valid indication is reset in block 124. Otherwise, the stack is popped to update the batch buffer fetch address and related state in block 112 and then the flow returns to block 114.

POSH Enable Command Buffers are as follows. POCS parses/traverses (does not execute) the ring buffer to look for batch buffers programmed with "POSH Start" field set. The "POSH Enable" field in the MI_BATCH_BUFFER_START command is a hint to POCS to traverse (parse, do not execute) the batch buffer to look for "POSH Start" batch buffers. The "POSH Enable" field is only inherited to the chained batch buffer and does not get inherited to the next level batch buffers, unlike the "POSH Start" field. The "POSH Enable" field is explicitly set in the MI_BATCH_BUFFER_START command which calls the next level batch buffers in order for the POCS to parse them to look for "POSH Start" batch buffers. "POSH Start" field takes precedence over the "POSH Enable" field in POCS. RCS ignores the "POSH Enable" field and has no implications due to the "POSH Enable" field set in the MI_BATCH_BUFFER_START command.

The POSH Ring Buffer operates as follows. The position only shader command streamer (POCS) and the render command streamer (RCS) share the same ring buffer. POCS parses the ring buffer to look for batch buffers start commands with "POSH Enable" or "POSH Start" fields set. It does not execute any commands programmed in the ring buffer. POCS and RCS executing the same ring buffer results in two different command sequences based on the "POSH Start" and "POSH Enable" fields programmed in various batch buffers (where BB stands for batch buffer).

The table below summarizes the "POSH Start" and "POSH Enable" batch buffer flags inherited across chained and nested (next level, first level to second level and to third level) batch buffers (where BB stands for "batch buffer").

| BB Flag/BB Type | Nested | Chained |
| --- | --- | --- |
| POSH Enable | Not inherited | Inherited |
| POSH Start | Inherited | Inherited |

The table below summarizes the POCS and RCS command parser behavior on seeing "POSH Enable" and "POSH Start" flags set (where CS stands for command streamer):

| BB Flags/CS | PCS | RCS |
| --- | --- | --- |
| None | Dropped | Executes |
| POSH Enable | Parses | Executes |
| POSH Start | Executes | Dropped |
| Both | Executes | Dropped |

Figure 4A:
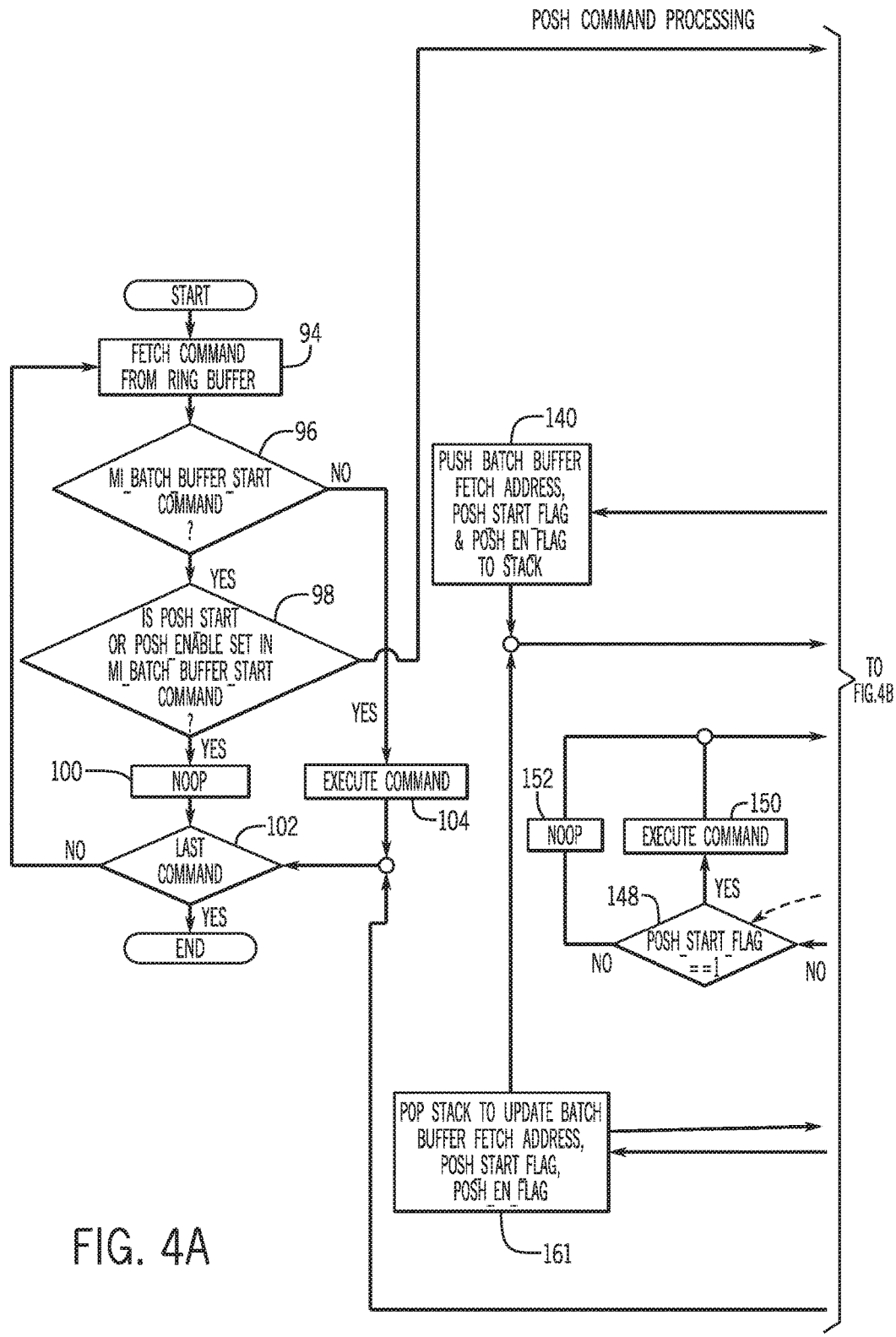
FIG. 4A is a flow chart for a POSH command processing according to another embodiment.
Figure 4B:
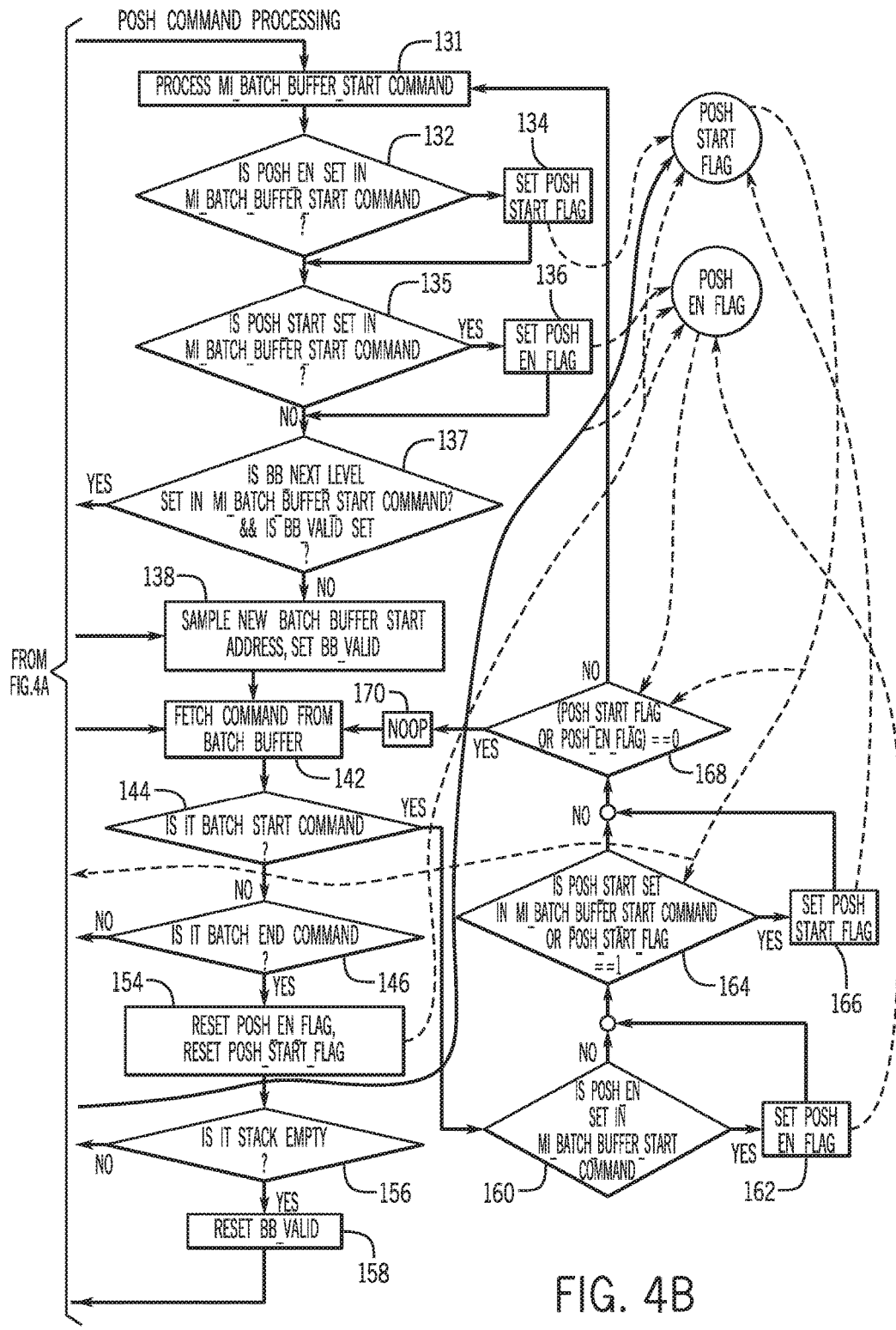
FIG. 4B is a flow chart that is a continuation of FIG. 4A according to another embodiment.

FIGS. 4A and 4B show POSH command processing according to one embodiment. The sequence shown in FIGS. 4A and 4B may be implemented in software, firmware and/or hardware. In software and firmware embodiments, it may be implemented by computer executed instructions stored in one or more non-transitory computer readable media such as magnetic, optical or semiconductor storages. For example, the instruction may be stored in a graphics processing unit or stored in a storage associated with the graphics processing unit, as two examples.

In FIG. 4A steps 94, 96, 98, 100, 102 and 104 are the same as already described in connection with FIG. 3. However, in FIG. 4A if a POSH Start or POSH Enable is set in MI_BATCH_BUFFER_START command, the flow continues as previously but, if that is not the case, then the flow goes to the POSH command processing in FIG. 4B.

First, the process MI_BATCH_BUFFER_START command is run in block 131 (FIG. 4B). Next, a check at diamond 132 determines whether POSH Enable is set in the MI_BATCH_BUFFER_START command. If so, the POSH Start flag is set as indicated in block 134.

If not, then a check at diamond 135 determines if POSH Start Sent is set in MI_BATCH_BUFFER_START. If so, the POSH Enable flag is set in block 136. If not, a check at diamond 137 determines whether the batch buffer next level is set in MI_BATCH_BUFFER_START command and the batch buffer valid is set. If so, the flow goes to block 140 in FIG. 4A. The batch buffer fetch address is pushed and the POSH Start flag and POSH Enable flag are pushed to the stack. The flow then returns to block 142 in either case from FIG. 4A or from block 138. Next, a check at diamond 144 determines is it a batch buffer start command. If not, a check at diamond 146 determines whether it is a batch end command.

If not, a check at diamond 148 determines whether POSH Start flag is equal to one. If so, the command is executed at 150 and otherwise a no operation is done at block 152 and the flow returns to block 142. Then, the POSH Enable flag and the POSH Start flag are reset in block 154 (FIG. 4B).

Next, a check at diamond 156 determines whether it is a stack empty. If so, the batch buffer valid is reset at 158 and otherwise the flow goes to block 161 (FIG. 4A) to pop the stack to update the batch buffer fetch address, POSH Start flag and POSH Enable flag. Then the flow goes back to block 142 (FIG. 4B).

If it is a batch start command at diamond 144, the flow goes to diamond 160. It checks whether the POSH Enable is set in the MI_BATCH_BUFFER_START command. If so, the POSH Enable flag is set in block 162.

If POSH Enable was found not to be set at diamond 160, a check at diamond 164 determines if POSH Start is set in MI_BATCH_BUFFER_START command or the POSH Start flag equals one. If so, set the POSH Start flag at block 166. If not, go to diamond block 168. Check whether the POSH Start flag or the POSH Enable flag is equal zero. If so, go to the NOOP 170 and back to block 142. If not, the flow goes back to block 131.

A mechanism runs two interdependent engines in parallel that look like a single monolithic engine to software scheduler. They provide flexibility to software to use a single ring buffer to submit command buffers to both POSH and RCS in an optimal way in some embodiments. It also allows software control over how far ahead POSH pipe may be enabled and synchronization hooks between the two executing pipes may be provided.

The techniques described herein with respect to an embodiment involving a position only shader and a render engine may be applied more generally to any slave engine, such as a position only shader, running in a pipe parallel to a main engine's pipe, where the slave engine runs ahead of the main engine.

Figure 6:
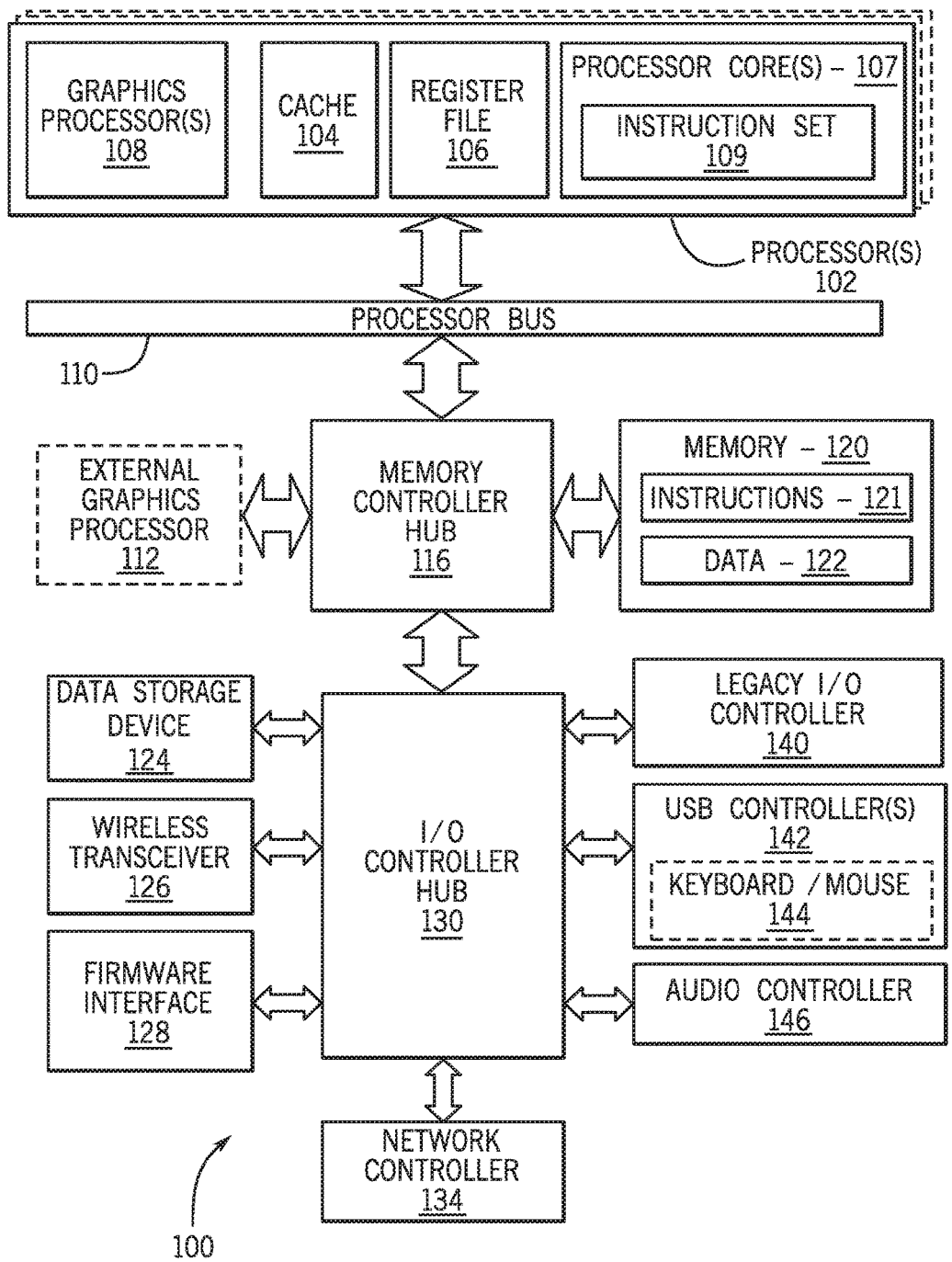
FIG. 6 is a block diagram of a processing system according to one embodiment.

FIG. 6 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In on embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 7:
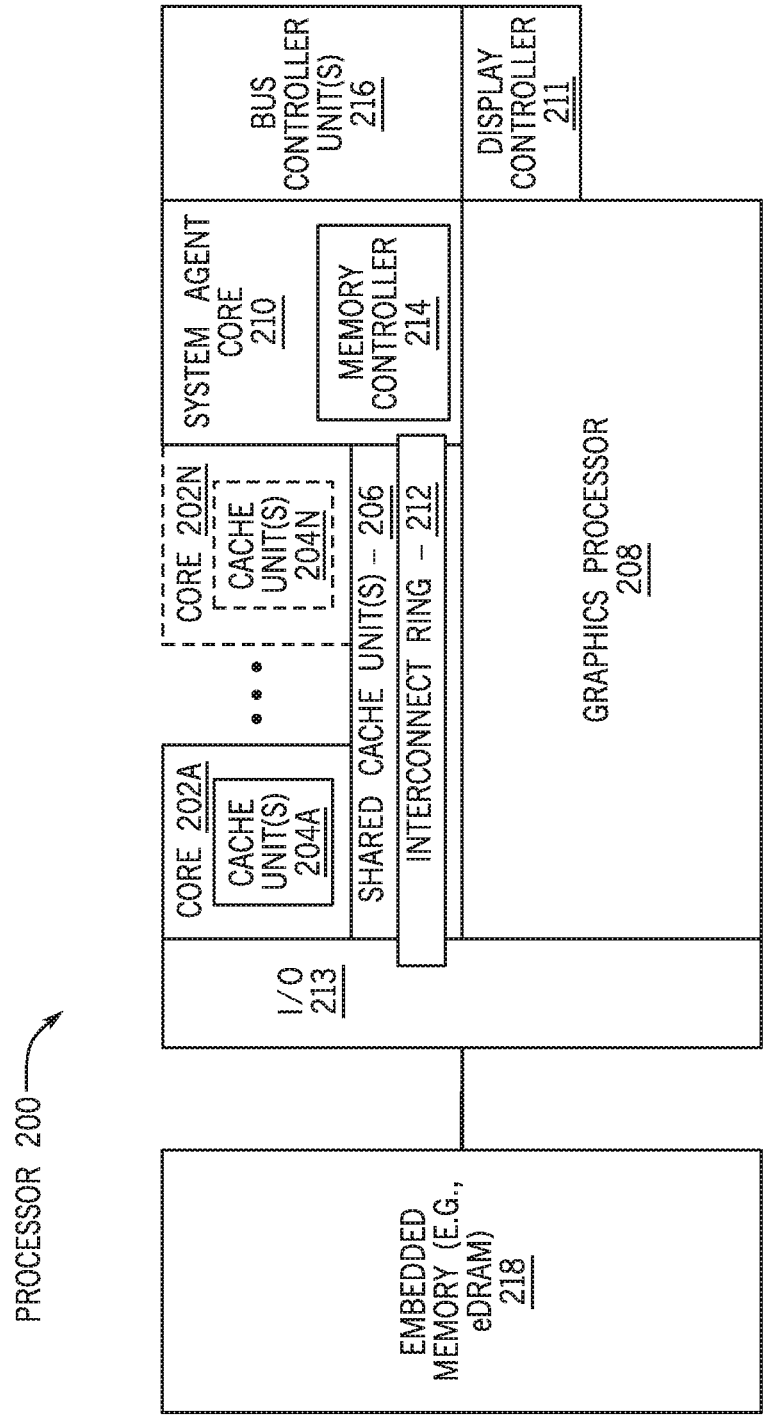
FIG. 7 is a block diagram of a processor according to one embodiment.

FIG. 7 is a block diagram of an embodiment of a processor 200 having one or more processor cores 202A-202N, an integrated memory controller 214, and an integrated graphics processor 208. Those elements of FIG. 7 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N.

In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 8:
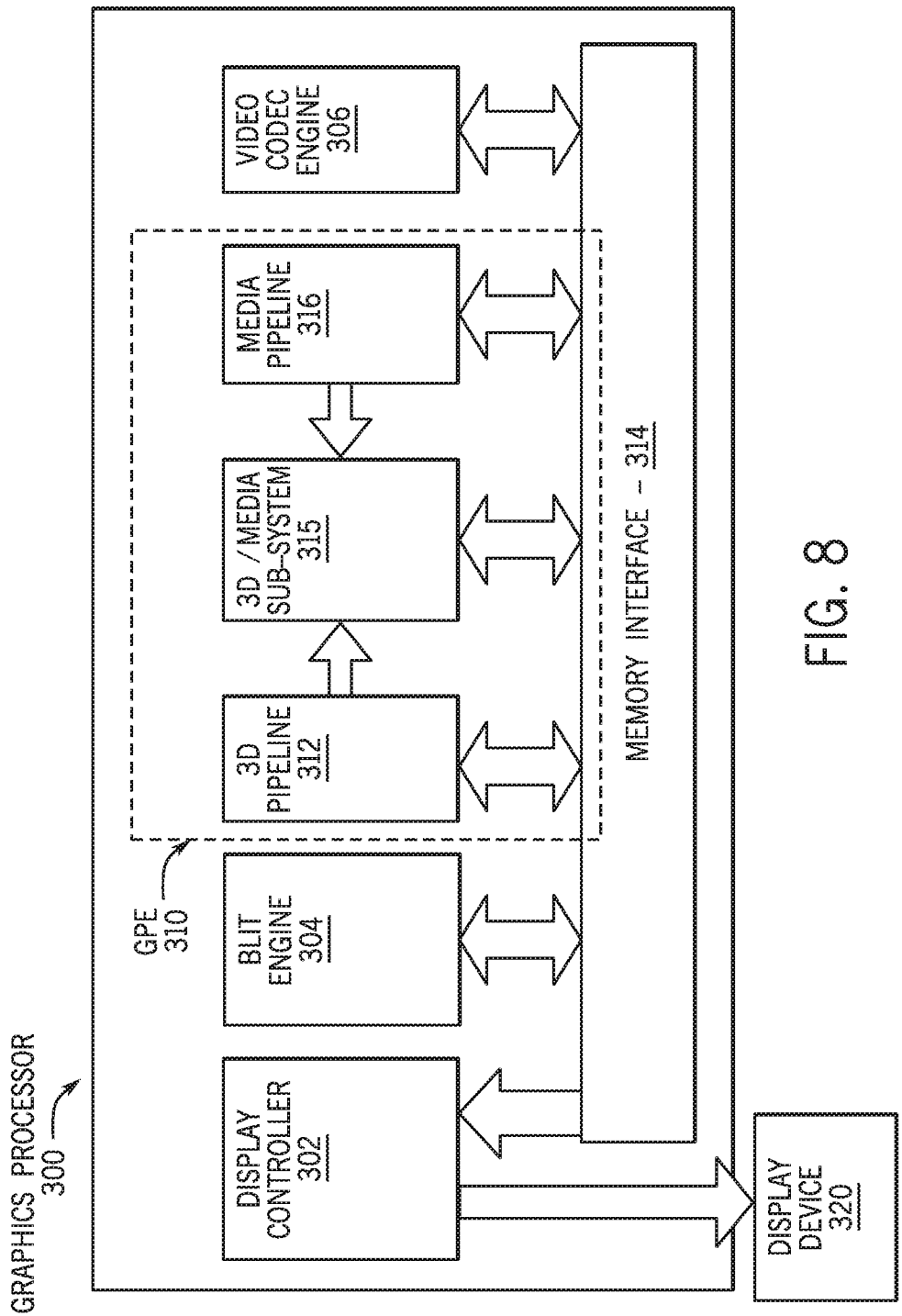
FIG. 8 is a block diagram of a graphics processor according to one embodiment.

FIG. 8 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, graphics processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

Figure 9:
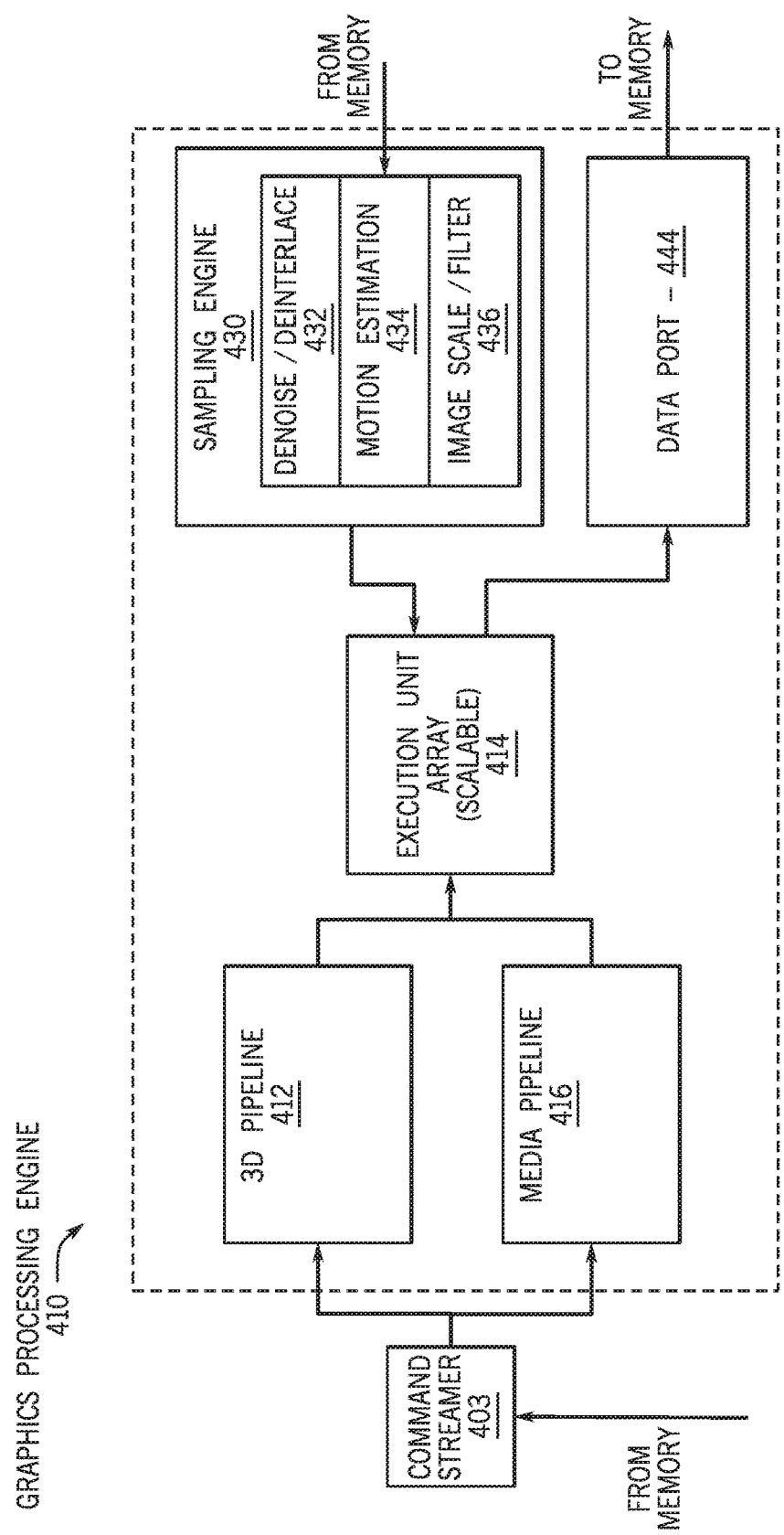
FIG. 9 is a block diagram of a graphics processing engine according to one embodiment.

FIG. 9 is a block diagram of a graphics processing engine 410 of a graphics processor in accordance with some embodiments. In one embodiment, the GPE 410 is a version of the GPE 310 shown in FIG. 8. Elements of FIG. 9 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The commands are directives fetched from a ring buffer, which stores commands for the 3D and media pipelines 412, 416. In one embodiment, the ring buffer can additionally include batch command buffers storing batches of multiple commands. The 3D and media pipelines 412, 416 process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Figure 10:
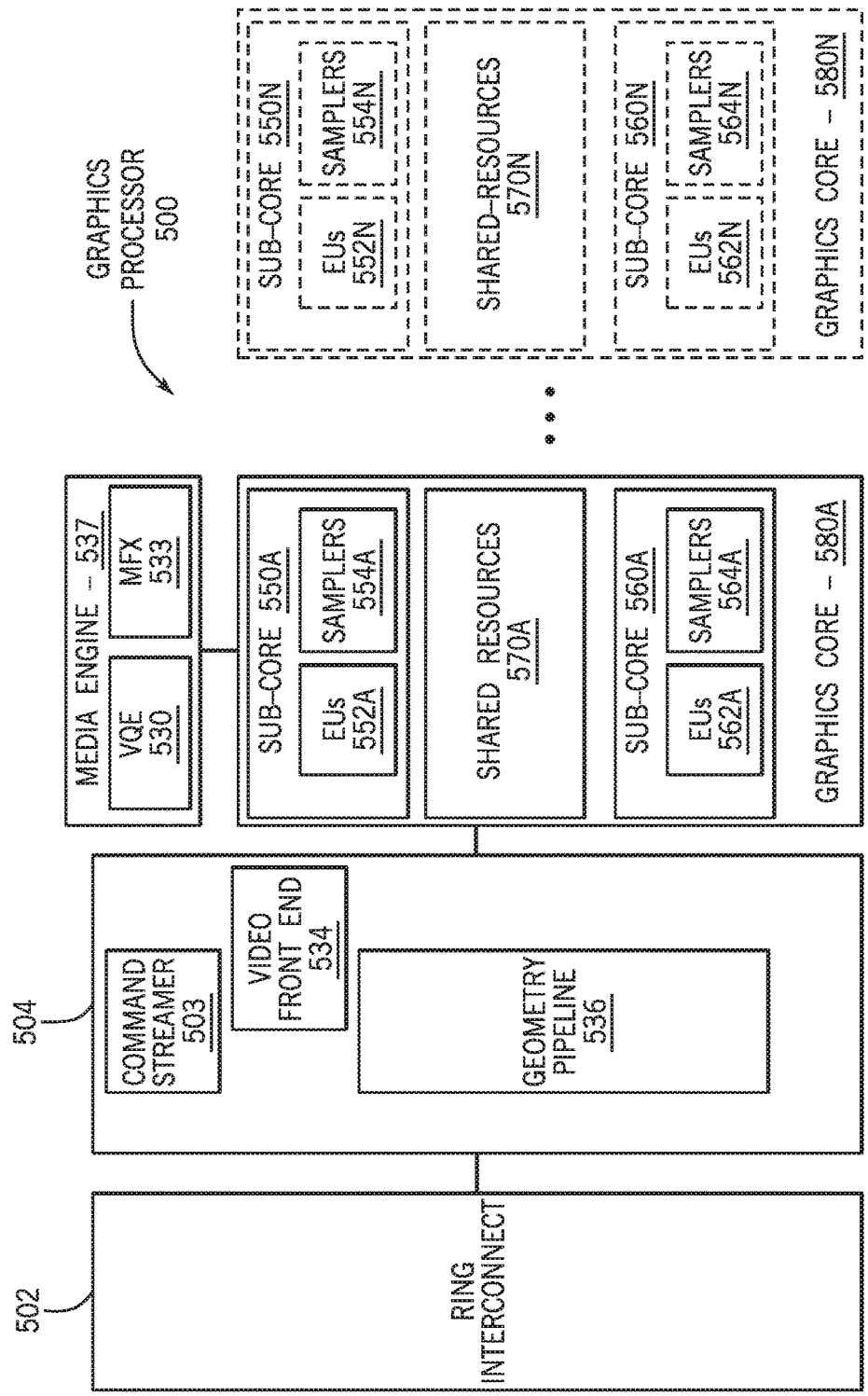
FIG. 10 is a block diagram of another embodiment of a graphics processor.

FIG. 10 is a block diagram of another embodiment of a graphics processor 500. Elements of FIG. 10 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Figure 11:
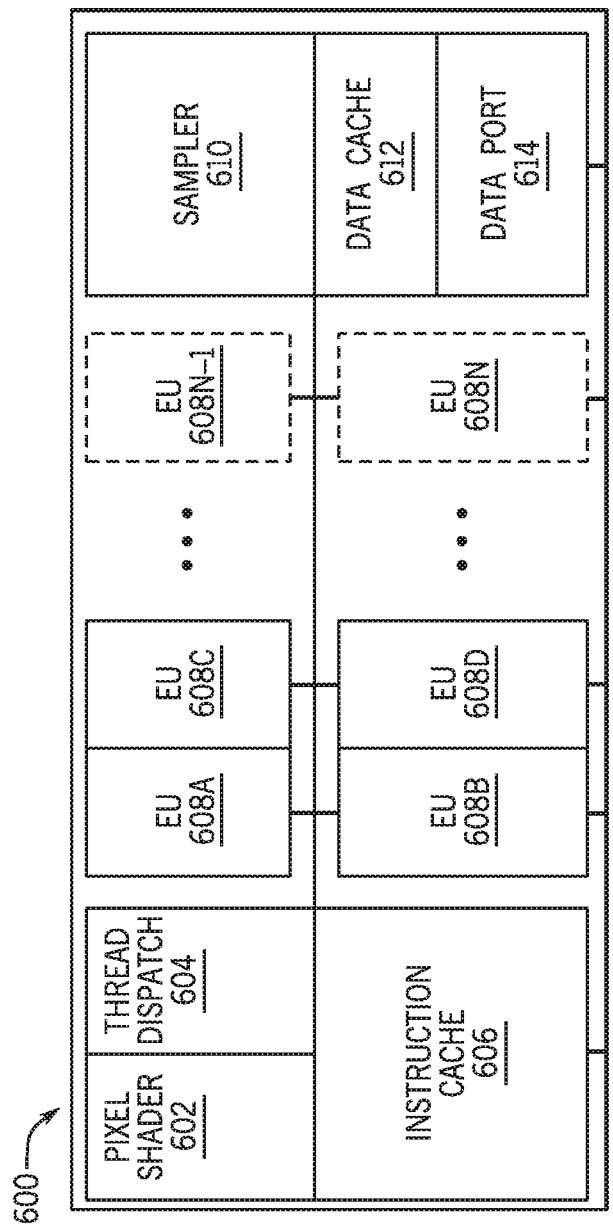
FIG. 11 is a depiction thread execution logic according to one embodiment.

FIG. 11 illustrates thread execution logic 600 including an array of processing elements employed in some embodiments of a GPE. Elements of FIG. 11 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-608N. In some embodiments, each execution unit (e.g. 608A) is an individual vector processor capable of executing multiple simultaneous threads and processing multiple data elements in parallel for each thread. In some embodiments, execution unit array 608A-608N includes any number individual execution units.

In some embodiments, execution unit array 608A-608N is primarily used to execute "shader" programs. In some embodiments, the execution units in array 608A-608N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-608N. For example, the geometry pipeline (e.g., 536 of FIG. 10) dispatches vertex processing, tessellation, or geometry processing threads to thread execution logic 600 (FIG. 11). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API)-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 12:
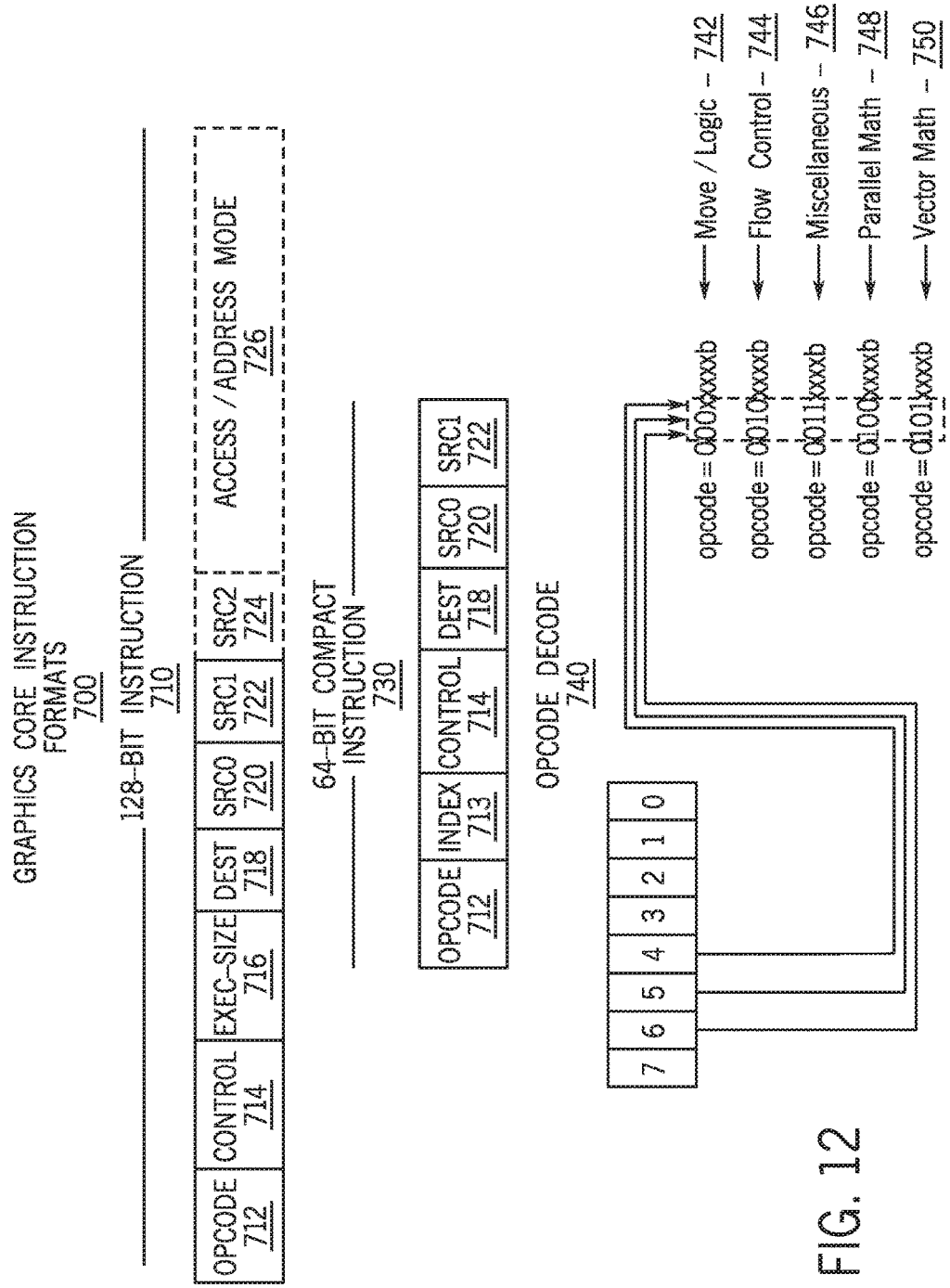
FIG. 12 is a block diagram of a graphics processor instruction format according to some embodiments.

FIG. 12 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 722, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode information 726 specifying, for example, whether direct register addressing mode or indirect register addressing mode is used. When direct register addressing mode is used, the register address of one or more operands is directly provided by bits in the instruction 710.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 710 may use byte-aligned addressing for source and destination operands and when in a second mode, the instruction 710 may use 16-byte-aligned addressing for all source and destination operands.

In one embodiment, the address mode portion of the access/address mode field 726 determines whether the instruction is to use direct or indirect addressing. When direct register addressing mode is used bits in the instruction 710 directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Figure 13:
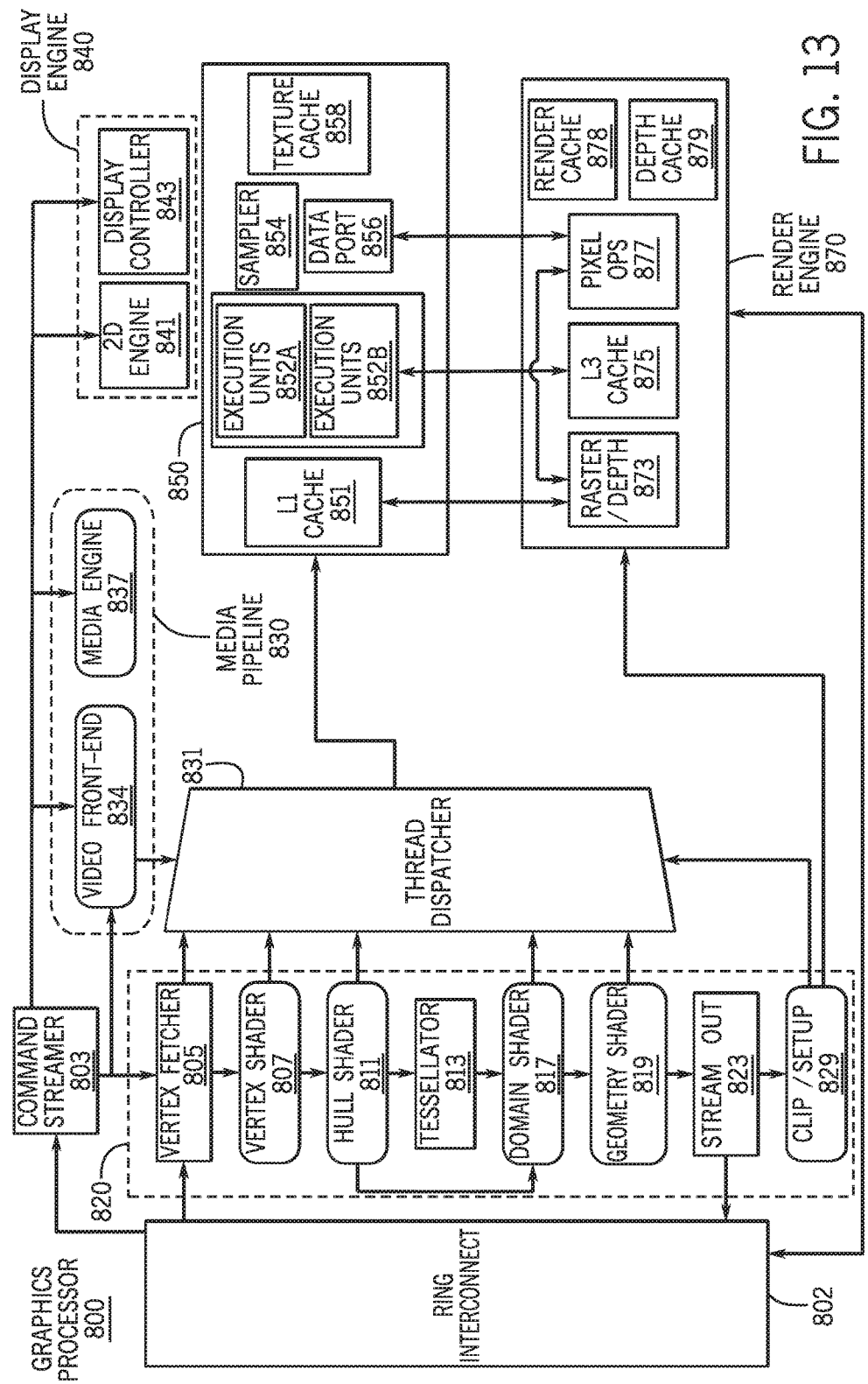
FIG. 13 is a block diagram of another embodiment of a graphics processor.

FIG. 13 is a block diagram of another embodiment of a graphics processor 800. Elements of FIG. 13 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer/depth 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access unrasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 337 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Figure 14A:
FIG. 14A is a block diagram of a graphics processor command format according to some embodiments.
Figure 14B:
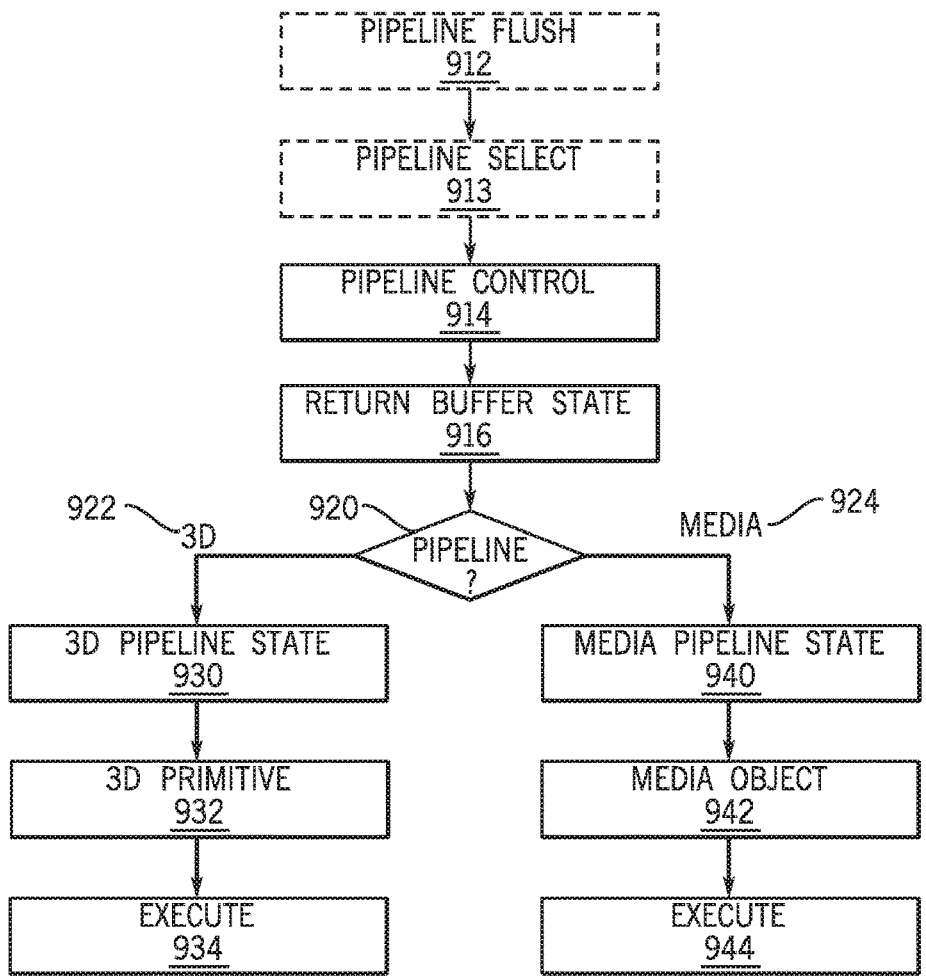
FIG. 14B is a block diagram illustrating a graphics processor command sequence according to some embodiments.

FIG. 14A is a block diagram illustrating a graphics processor command format 900 according to some embodiments. FIG. 14B is a block diagram illustrating a graphics processor command sequence 910 according to an embodiment. The solid lined boxes in FIG. 14A illustrate the components that are generally included in a graphics command while the dashed lines include components that are optional or that are only included in a sub-set of the graphics commands. The exemplary graphics processor command format 900 of FIG. 14A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 14B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Figure 15:
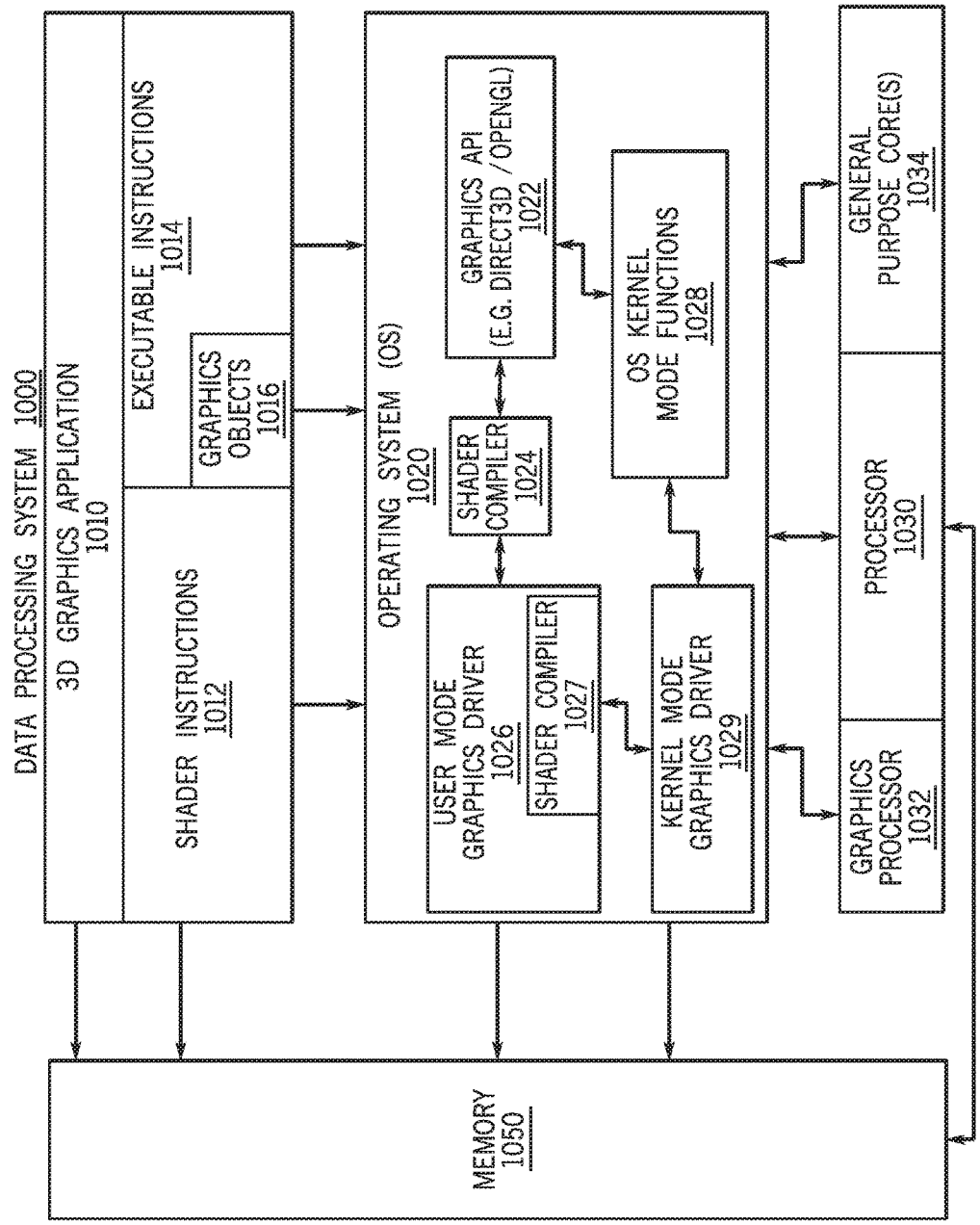
FIG. 15 is a depiction of an exemplary graphics software architecture according to some embodiments.

FIG. 15 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 16:
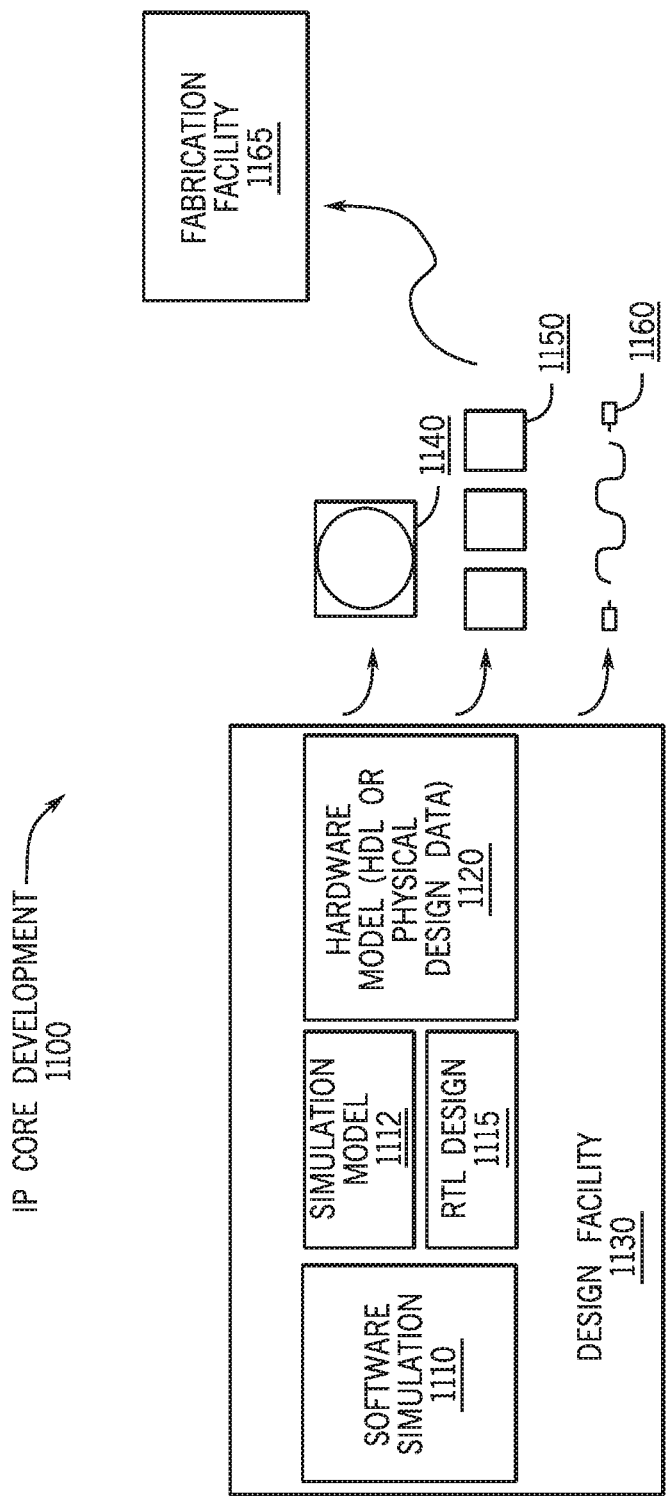
FIG. 16 is a block diagram illustrating an IP core development system according to some embodiments.

FIG. 16 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 17:
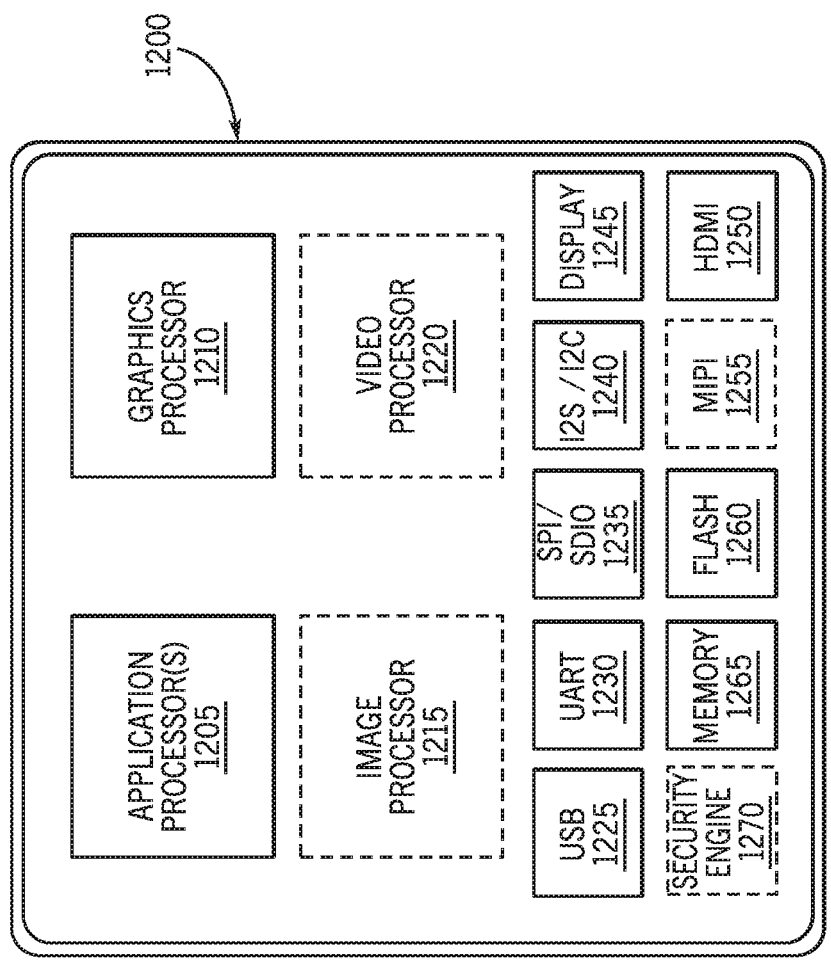
FIG. 17 is a block diagram showing an exemplary system on chip integrated circuit according to some embodiments.

FIG. 17 is a block diagram illustrating an exemplary system on a chip integrated circuit 1200 that may be fabricated using one or more IP cores, according to an embodiment. The exemplary integrated circuit includes one or more application processors 1205 (e.g., CPUs), at least one graphics processor 1210, and may additionally include an image processor 1215 and/or a video processor 1220, any of which may be a modular IP core from the same or multiple different design facilities. The integrated circuit includes peripheral or bus logic including a USB controller 1225, UART controller 1230, an SPI/SDIO controller 1235, and an $I^2S/I^2C$ controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Additionally, other logic and circuits may be included in the processor of integrated circuit 1200, including additional graphics processors/cores, peripheral interface controllers, or general purpose processor cores.

The following clauses and/or examples pertain to further embodiments:

One example embodiment may be a method comprising providing an interface for submitting workloads to a slave engine running in a one parallel pipe to assist a main engine running in another parallel pipe, and separating command sequences for each parallel pipe to enable the slave engine to run ahead of the main engine. The method may also include wherein the slave engine is a position only shader and said main engine is a render engine. The method may also include determining if context has been submitted to a render engine exercising position only shading functionality. The method may also include setting a bit in the render engine to indicate position only shading is enabled. The method may also include inheriting the position only shading field only to a chained batch buffer. The method may also include providing separate command streamers for the render engine and position only shader. The method may also include sharing a ring buffer between said position only shader and render engine. The method may also include providing separate command streamers for a render pipeline and a position only shading pipeline. The method may also include providing all commands initially to the command streamer for the render pipeline which then forwards commands for the command streamer of the position only shading pipeline command streamer. The method may also include accessing the same ring buffer from both pipelines.

Another example embodiment may be one or more non-transitory computer readable media storing instructions to perform a sequence comprising providing an interface for submitting workloads to a slave engine running in a one parallel pipe to assist a main engine running in another parallel pipe, and separating command sequences for each parallel pipe to enable the slave engine to run ahead of the main engine. The method may include further storing instructions to perform a sequence wherein the slave engine is a position only shader and said main engine is a render engine. The method may include further storing instructions to perform a sequence including determining if context has been submitted to a render engine exercising position only shading functionality. The method may include further storing instructions to perform a sequence including setting a bit in the render engine to indicate position only shading is enabled. The method may include further storing instructions to perform a sequence including inheriting the position only shading field only to a chained batch buffer. The method may include further storing instructions to perform a sequence including providing separate command streamers for the render engine and position only shader. The method may include further storing instructions to perform a sequence including sharing a ring buffer between said position only shader and render engine. The method may include further storing instructions to perform a sequence including providing separate command streamers for a render pipeline and a position only shading pipeline. The method may include further storing instructions to perform a sequence including providing all commands initially to the command streamer for the render pipeline which then forwards commands for the command streamer of the position only shading pipeline command streamer. The method may include further storing instructions to perform a sequence including accessing the same ring buffer from both pipelines.

In another example embodiment may be an apparatus comprising a processor to provide an interface for submitting workloads to a slave engine running in a one parallel pipe to assist a main engine running in another parallel pipe, separate command sequences for each parallel pipe to enable the slave engine to run ahead of the main engine, and a memory coupled to said processor. The apparatus may include wherein the slave engine is a position only shader and said main engine is a render engine. The apparatus may include said processor to determine if context has been submitted to a render engine exercising position only shading functionality. The apparatus may include said processor to set a bit in the render engine to indicate position only shading is enabled. The apparatus may include said processor to inherit the position only shading field only to a chained batch buffer. The apparatus may include said processor to provide separate command streamers for the render engine and position only shader. The apparatus may include said processor to share a ring buffer between said position only shader and render engine. The apparatus may include said processor to provide separate command streamers for a render pipeline and a position only shading pipeline. The apparatus may include said processor to provide all commands initially to the command streamer for the render pipeline which then forwards commands for the command streamer of the position only shading pipeline command streamer. The apparatus may include said processor to access the same ring buffer from both pipelines.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
   providing a render engine and a position only shader, said position only shader to run ahead of the render engine, said position only shader including a first command streamer, a first vertex fetch and a first vertex shader, said first vertex fetch and first vertex shader to identify non-visible primitives for the render engine, said position only shader to fetch and shade only position attributes and to record visibility information for each primitive in a draw call and to record this information in a storage accessible to said render engine, said render engine to include a second command streamer, a second vertex fetch and second vertex shader to handle non-position attributes, said first and second command streamers using a common buffer and operating asynchronously to one another with respect to accessing said common buffer;
separating command sequences for each parallel pipe to enable the position only shader to run ahead of the render engine by at least one draw call and to enable the render engine to obtain position attributes for a prior draw call while the position only shader is working on a next draw call.

2. The method of claim 1 wherein the position only shader is a slave engine and said render engine is a main engine.

3. The method of claim 2 including determining if a context has been submitted to a render engine exercising position only shading functionality.

4. The method of claim 3 including setting a bit in the render engine to indicate position only shading is enabled.

5. The method of claim 4 including inheriting the position only shading field only to a chained batch buffer.

6. The method of claim 5 including providing separate command streamers for the render engine and position only shader.

7. The method of claim 6 including sharing a ring buffer between said position only shader and render engine.

8. The method of claim 2 including providing separate command streamers for a render pipeline and a position only shading pipeline.

9. The method of claim 8 including providing all commands initially to the command streamer for the render pipeline which then forwards commands for the command streamer of the position only shading pipeline command streamer.

10. The method of claim 8 including accessing the same ring buffer from both pipelines.

11. One or more non-transitory computer readable media storing instructions to perform a sequence comprising:
running a position only shader ahead of a render engine to identify non-visible primitives for the render engine, said position only shader including a first command streamer, a first vertex fetch and a first vertex shader, said first vertex fetch and first vertex shader, said position only shader to fetch and shade only position attributes and to record visibility information for each primitive in a draw call and to record this information in a storage accessible to said render engine, said render engine to include a second command streamer, a second vertex fetch and second vertex shader to handle non-position attributes, said first and second command streamers using a common buffer and operating asynchronously to one another with respect to accessing said common buffer;
submitting workloads to the position only shader running in one parallel pipe to assist the render engine running in another parallel pipe; and
separating command sequences for each parallel pipe to enable the position only shader to run ahead of the render engine by at least one draw call and to enable the render engine to obtain position attributes for a prior draw call while the position only shader is working on a next draw call.

12. The media of claim 11, further storing instructions to perform a sequence wherein the position only shader is a slave engine and said render engine is a main engine.

13. The media of claim 12, further storing instructions to perform a sequence including determining if a context has been submitted to a render engine exercising position only shading functionality.

14. The media of claim 13, further storing instructions to perform a sequence including setting a bit in the render engine to indicate position only shading is enabled.

15. The media of claim 14, further storing instructions to perform a sequence including inheriting the position only shading field only to a chained batch buffer.

16. The media of claim 15, further storing instructions to perform a sequence including providing separate command streamers for the render engine and position only shader.

17. The media of claim 16, further storing instructions to perform a sequence including sharing a ring buffer between said position only shader and render engine.

18. The media of claim 12, further storing instructions to perform a sequence including providing separate command streamers for a render pipeline and a position only shading pipeline.

19. The media of claim 18, further storing instructions to perform a sequence including providing all commands initially to the command streamer for the render pipeline which then forwards commands for the command streamer of the position only shading pipeline.

20. The media of claim 18, further storing instructions to perform a sequence including accessing the same ring buffer from both pipelines.

21. An apparatus comprising:
a processor to provide a render engine and a position only shader, said position only shader to run ahead of the render engine, said position only shader including a first command streamer, a first vertex fetch and a first vertex shader, said first vertex fetch and first vertex shader to identify non-visible primitives for the render engine, said position only shader to fetch and shade only position attributes and to record visibility information for each primitive in a draw call and to record this information in a storage accessible to said render engine, said render engine to include a second command streamer, a second vertex fetch and second vertex shader to handle non-position attributes, said first and second command streamers using a common buffer and operating asynchronously to one another with respect to accessing said common buffer, separate command sequences for each parallel pipe to enable the position only shader to run ahead of the render engine by at least one draw call and to enable the render engine to obtain position attributes for a prior draw call while the position only shader is working on a next draw call; and
a memory coupled to said processor.

22. The apparatus of claim 21, wherein the position only shader is a slave engine and said render engine is a main engine.

23. The apparatus of claim 22, said processor to determine if a context has been submitted to a render engine exercising position only shading functionality.

24. The apparatus of claim 23, said processor to set a bit in the render engine to indicate position only shading is enabled.

25. The apparatus of claim 24, said processor to inherit the position only shading field only to a chained batch buffer.

26. The apparatus of claim 25, said processor to provide separate command streamers for the render engine and position only shader.

27. The apparatus of claim 26, said processor to share a ring buffer between said position only shader and render engine.

28. The apparatus of claim 22, said processor to provide separate command streamers for a render pipeline and a position only shading pipeline.

29. The apparatus of claim 28, said processor to provide all commands initially to the command streamer for the render pipeline which then forwards commands for the command streamer of the position only shading pipeline.

30. The apparatus of claim 28, said processor to access the same ring buffer from both pipelines.

* * * * *